United States Patent
Kwok et al.

(10) Patent No.: US 7,627,596 B2
(45) Date of Patent: Dec. 1, 2009

(54) RETRIEVING HANDWRITTEN DOCUMENTS USING MULTIPLE DOCUMENT RECOGNIZERS AND TECHNIQUES ALLOWING BOTH TYPED AND HANDWRITTEN QUERIES

(75) Inventors: Thomas Yu-Kiu Kwok, Washington Township, NJ (US); James Randal Moulic, Poughkeepsie, NY (US); Kenneth Blair Ocheltree, Ossining, NY (US); Michael Peter Perrone, Yorktown Heights, NY (US); John Ferdinand Pitrelli, Danbury, CT (US); Eugene Henry Ratzlaff, Hopewell Junction, NY (US); Gregory Fraser Russell, Yorktown Heights, NY (US); Jayashree Subrahmonia, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1739 days.

(21) Appl. No.: 10/079,741

(22) Filed: Feb. 19, 2002

(65) Prior Publication Data

US 2002/0165873 A1    Nov. 7, 2002

Related U.S. Application Data

(60) Provisional application No. 60/327,604, filed on Oct. 4, 2001.

(51) Int. Cl.
*G06F 17/00* (2006.01)

(52) U.S. Cl. ........................... 707/102; 715/268

(58) Field of Classification Search ................. 715/503, 715/500, 513; 707/3; 209/584, 589; 382/187
See application file for complete search history.

(56) References Cited

U.S. PATENT DOCUMENTS

| | | | |
|---|---|---|---|
| 5,812,698 A * | 9/1998 | Platt et al. .................... 382/186 |
| 5,953,451 A * | 9/1999 | Syeda-Mahmood ......... 382/187 |
| 6,202,060 B1 * | 3/2001 | Tran .............................. 707/3 |
| 6,740,836 B2 * | 5/2004 | Ryan et al. ................... 209/584 |
| 6,775,665 B1 * | 8/2004 | Piersol .......................... 707/4 |
| 2002/0069220 A1 * | 6/2002 | Tran ........................... 707/503 |
| 2003/0121839 A1 * | 7/2003 | Ryan et al. ................... 209/589 |
| 2003/0125835 A1 * | 7/2003 | William et al. .............. 700/223 |

* cited by examiner

*Primary Examiner*—Sathyanarayan Pannala
(74) *Attorney, Agent, or Firm*—Ryan, Mason & Lewis, LLP

(57) ABSTRACT

The techniques in the present invention allow both text and handwritten queries, and the queries can be single-word or multiword. Generally, each handwritten word in a handwritten document is converted to a document stack of words, where each document stack contains a list of text words and a word score of some type for each text word in the list. The query is also converted to one or more stacks of words. A measure is determined from each query and document stack. Documents that meet search criteria in the query are then selected based on the query and the values of the measures. The present invention also performs multiple recognitions, with multiple recognizers, on a handwritten document to create multiple recognized transcriptions of the document. The multiple transcriptions are used for document retrieval. In another embodiment, a single transcription is created from the multiple transcriptions, and the single transcription is used for document retrieval.

8 Claims, 7 Drawing Sheets

RETRIEVING HANDWRITTEN DOCUMENTS USING MULTIPLE DOCUMENT RECOGNIZERS AND TECHNIQUES ALLOWING BOTH TYPED AND HANDWRITTEN QUERIES

CROSS REFERENCE TO RELATED APPLICATIONS

This application is related to United States Provisional Patent Application entitled "Adaptive Recognition Improvement Using Modified N-Best Lists: The Use of Handwritten Word Recognition Characteristics to Improve Handwritten Word Recognition Accuracy," filed Feb. 22, 2001, by inventors Kwok and Perrone, Ser. No. 60/271,012, and incorporated by reference herein.

This application claims the benefit of U.S. Provisional Application No. 60/327,604, filed Oct. 4, 2001.

FIELD OF THE INVENTION

The present invention relates to machine handwriting recognition and, more particularly, relates to retrieving handwritten documents using multiple document recognizers and techniques allowing both typed and handwritten queries.

BACKGROUND OF THE INVENTION

The value of computerized storage of handwritten documents would be greatly enhanced if they could be searched and retrieved in ways analogous to the methods used for text documents. If precise transcripts of handwritten documents exist, then information retrieval (IR) techniques can be applied. However, such transcripts are typically too costly to generate by hand, and machine recognition methods for automating the process of transcript generation are far from perfect. Thus, such transcripts are usually either incomplete or corrupted by incorrect transcriptions, or both.

Even though transcripts have these types of problems, IR is still used on them, primarily through two techniques commonly called "text-to-text" matching and "ink-to-ink" matching. With "text-to-text" matching, or simply text matching, each handwritten document is converted to text and a text query is compared to the text of the handwritten document to determine if there are any matches. Generally, most handwriting machine transcription systems generate a list of alternative words, with corresponding word scores, for each handwritten word (also called an "ink word" herein) in the document. The word score indicates the likelihood that the associated text word is the correct transcription for the corresponding ink word. The word in the list with the highest word score is selected as the word that is subsequently used for text matching.

One problem with the first technique for IR is that the query cannot be handwritten and must, instead, be typewritten or converted from handwriting to text with concomitant errors in document transcription. A second problem with this technique occurs because of the errors in transcription. An error in transcription can prevent a document from being retrieved when the document should be retrieved. For example, if a person writes the word "cat" as part of a document, the handwritten word "cat" may be converted to the following list of alternative text words: (1) "cut" with a word score of 100; (2) "cot" with a word score of 95; (3) "cat" with a word score of 94; and (4) "lot" with a word score of 10. When this document is transcribed and stored, the word "cut" has the highest word score, and will be selected as the most probable transcription. The word "cut" will be the only stored word. If a user types in the text query "cat," this query may not find this document because this instance of the handwritten word "cat" is incorrectly transcribed. This is true even though the recognition list (or "stack") contains the true transcription of the written word "cat." Moreover, if the writer is consistent, it is likely that any handwritten instance of "cat" will be similarly erroneously transcribed.

For the case in which recognition accuracy is not high, high word redundancy in the target documents can compensate for the imperfect transcription. However, this may not work if document word redundancy is low, as is common in short documents, or if recognition accuracy is not high, as is common for some handwritten documents.

Some have addressed the problem of transcription errors on retrieval in the context of speech, which can be analogous to retrieval of handwritten documents. To reduce transcription errors during retrieval, one of these approaches relies on query expansion, while a second employs a variety of string distance methods, and a third uses global information about probable phoneme confusions in the form of an average confusion matrix for all data observed. These techniques are described in the following respective documents, the disclosures of which are incorporated herein by reference: Jourlin et al., "Improving retrieval on imperfect speech transcription," Proc. of the 22nd Annual Int'l Ass'n of Computing Machinery (ACM) Special Interest Group on IR (SIGIR) Conf. on Research and Development in IR, 283-284 (August, 1999); Zobel et al., "Phonetic String Matching: Lessons from Information Retrieval," Proc. of the 19th Ann. Int'l ACM SIGIR Conf. on Research and Development in IR, 166-172 (August, 1996); and Srinivasan et al., "Phonetic confusion matrix based spoken document retrieval," Proc. of the 23rd Ann. Int'l ACM SIGIR Conf. on Research and Development in IR, 81-87 (July, 2000). While these approaches limit the effect of transcription errors, they still do not allow for handwritten queries.

The second technique for IR on handwritten documents is matching a handwritten query to handwritten words in a handwritten document (often called "ink-to-ink" matching). A class of successful approaches uses template matching between query ink and document ink. This is explained in more detail in each of the following references, the disclosures of which are incorporated herein by reference: Aref et al., "The Handwritten Trie: Indexing Electronic Ink," Proc. of the 1995 ACM Special Interest Group on Management of Data (SIGMOD) Int'l Conf. on Management of Data 151-162 (May, 1995); El-Nasan et al., "Ink-Link," Proc. of the 15th Int'l Conf. on Pattern Recognition, vol. 2, 573-576 (Sept., 2000); Lopresti et al., "On the Searchability of Electronic Ink," Proc. of the 6th Int'l Workshop on the Frontiers of Handwriting Recognition (August, 1998); and Lopresti et al., "Crossdomain searching Using Handwritten Queries. In Proc. of the 7th Int'l Workshop on the Frontiers of Handwriting Recognition (September, 2000). However, this method can be very slow if the number of documents to be searched is large and the match method is very complex. Additionally, it does not allow for text queries and will suffer if writing styles differ.

Another approach successfully used subunits of handwriting to handle inaccuracies in machine transcription. This approach attempts to reduce the complexity of the recognition process at the expense of allowing certain handwritten words to become ambiguous. This approach is discussed in Cooper, "How to Read Less and Know More: Approximate OCR for Thai," Proc. of the 20th Ann. Int'l ACM SIGIR Conf. on Research and Development in IR, 216-225 (July, 1997).

This approach was found to work well in domains in which words were long and easily distinguishable and more poorly in domains with a lot of similar words. Again, this approach does not allow text queries.

Currently, therefore, retrieval techniques exist that allow a user to enter text or written queries, but not both, to search handwritten documents. Also, these techniques do not work satisfactorily when the transcription is imperfect.

SUMMARY OF THE INVENTION

The present invention provides techniques for retrieving handwritten documents. Some of these techniques allow both text and handwritten queries. The queries can be single-word or multiword. Generally, each handwritten word in a handwritten document is converted to a document stack of words, where each document stack contains a list of text words and a word score of some type for each text word in the list. The word score indicates the likelihood that this particular word is the correct transcription of the ink word to which it corresponds. It should be noted that the likelihood is relative to a given handwriting recognition model or recognizer. The query is also converted to one or more stacks of words. A measure is determined from each query and document stack. This measure models the statistical patterns that appear in stacks to correct errors that occur in transcription. Documents that meet search criteria in the query are then selected based on the query and the values of the measures.

Additionally, to improve retrieval, embodiments of the present invention perform multiple recognitions, with multiple recognizers, on a handwritten document to create multiple recognized transcriptions of the document. The multiple transcriptions are used for document retrieval. In another embodiment, a single transcription is created from the multiple transcriptions, and the single transcription is used for document retrieval. Additionally, another embodiment performs multiple recognitions, with multiple recognizers, on a query. The resultant multiple transcriptions of the query can be used for document retrieval or combined into one transcription, which is then used for document retrieval.

A more complete understanding of the present invention, as well as further features and advantages of the present invention, will be obtained by reference to the following detailed description and drawings.

DETAILED DESCRIPTION OF PREFERRED EMBODIMENTS

The present invention improves handwritten document retrieval by improving queries and handwritten document transcription. To improve queries, the present invention allows both text and handwritten queries to be used when searching handwritten documents. The present invention also provides a way of dealing with errors in the transcription process, by determining a measure between each query and document stack. This measure allows queries to find imperfect transcriptions of words in transcribed handwritten documents. To improve document transcription, multiple recognitions are performed on a handwritten document by multiple handwriting recognizers. The multiple transcriptions are used by themselves or are combined into one transcription. A query is compared with the multiple or single transcription to determine which handwritten documents meet search criteria in the query. By using multiple handwriting recognizers, an improvement in handwriting transcription should occur.

Figure 3:
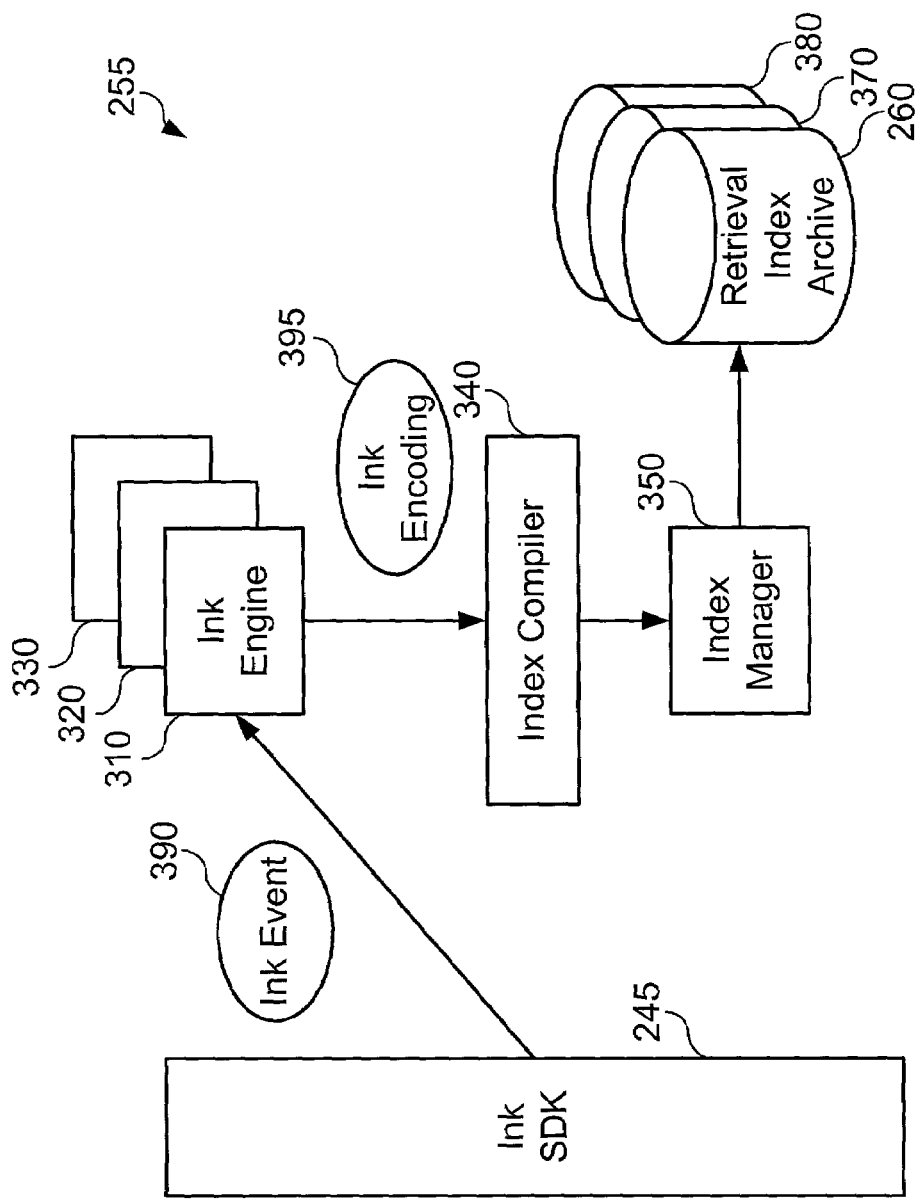
FIG. 3 is a block diagram of an index builder in accordance with one embodiment of the present invention.
Figure 4:
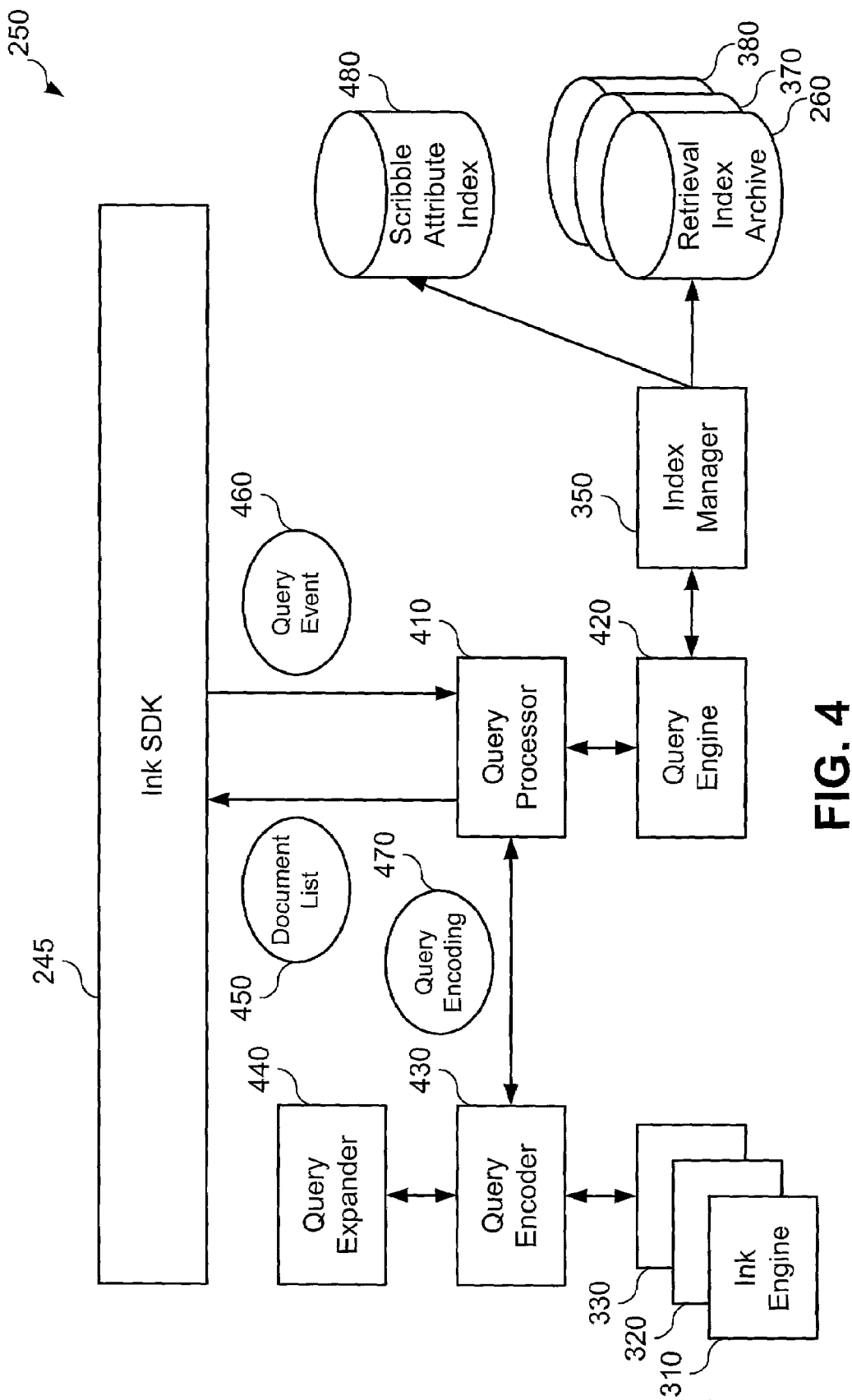
FIG. 4 is a block diagram of a query engine in accordance with one embodiment of the present invention.
Figure 5:
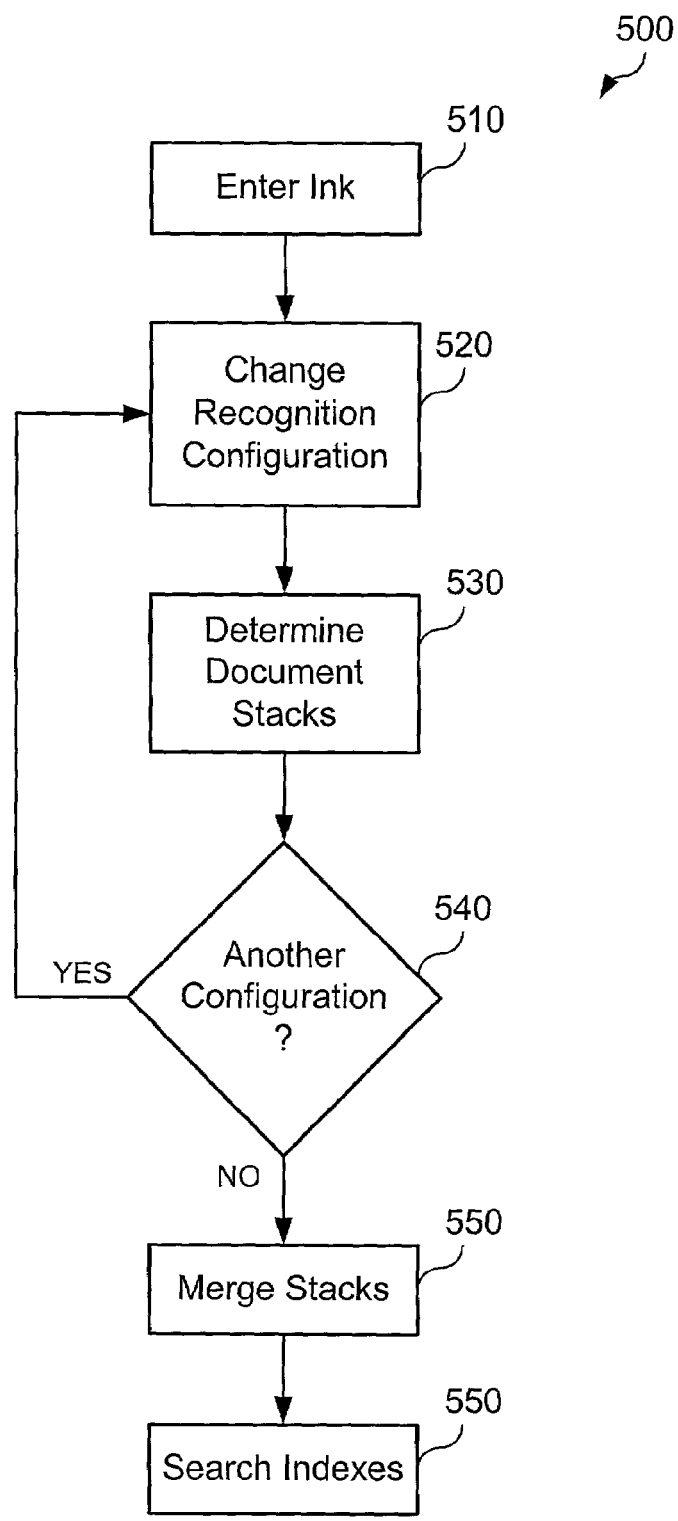
FIG. 5 is a method for determining and using multiple document recognitions, in accordance with one embodiment of the present invention.
Figure 6:
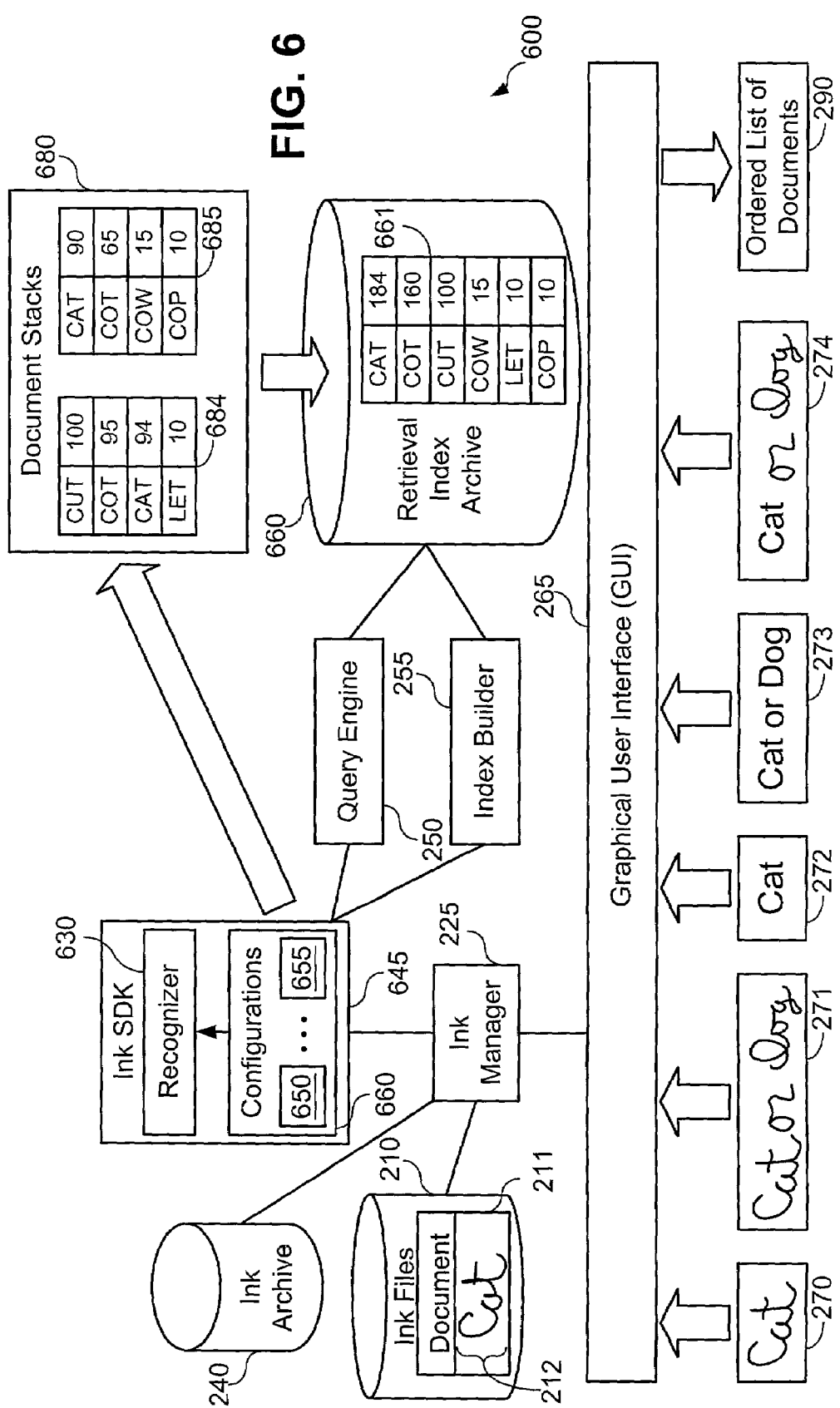
FIG. 6 is a block diagram of a system for determining and using multiple document recognitions, in accordance with one embodiment of the present invention.

FIGS. 1 through 4 are used to illustrate techniques involving query expansion and determination, while FIGS. 5 and 6 are used to illustrate techniques involving multiple recognitions.

Figure 1:
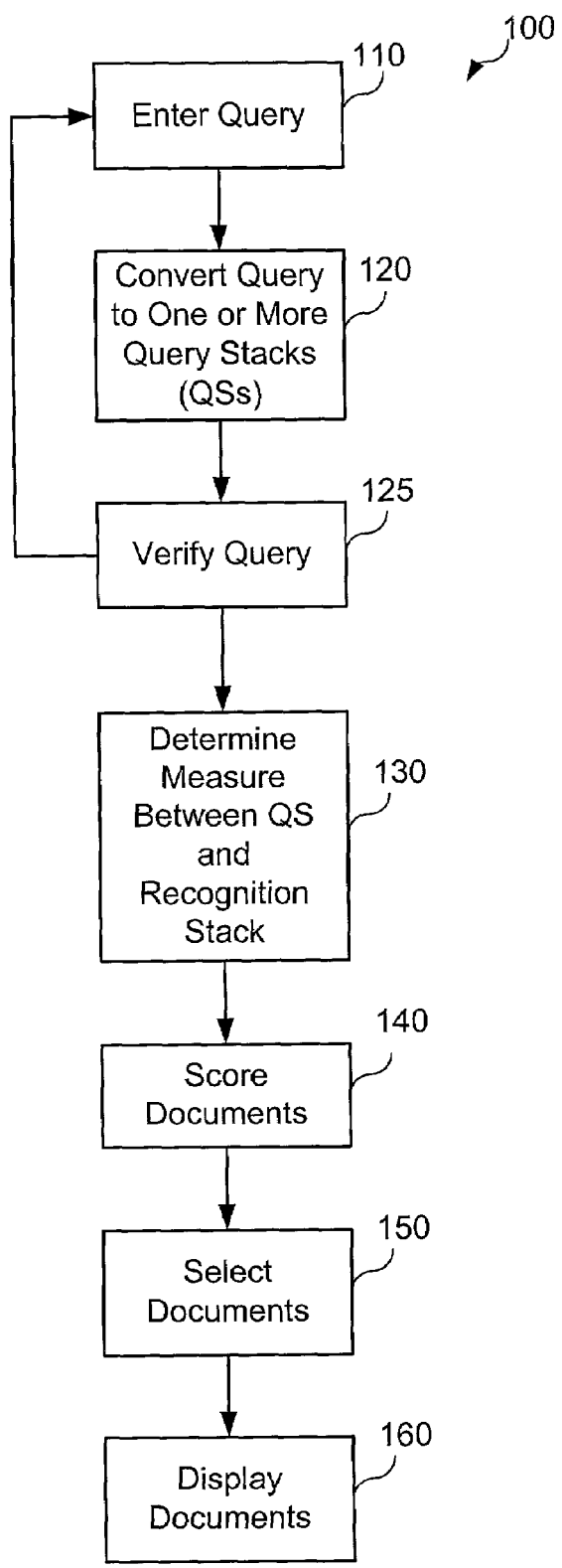
FIG. 1 is a flowchart of a method for retrieving handwritten documents in accordance with one embodiment of the present invention.

Referring now to FIG. 1, this figure shows a flowchart of a method 100 for retrieving handwritten documents in accordance with one embodiment of the present invention. Method 100 is used whenever a user enters a query with the intent to query a number of handwritten documents for criteria in the query and to subsequently view documents that contain the query criteria.

Figure 2:
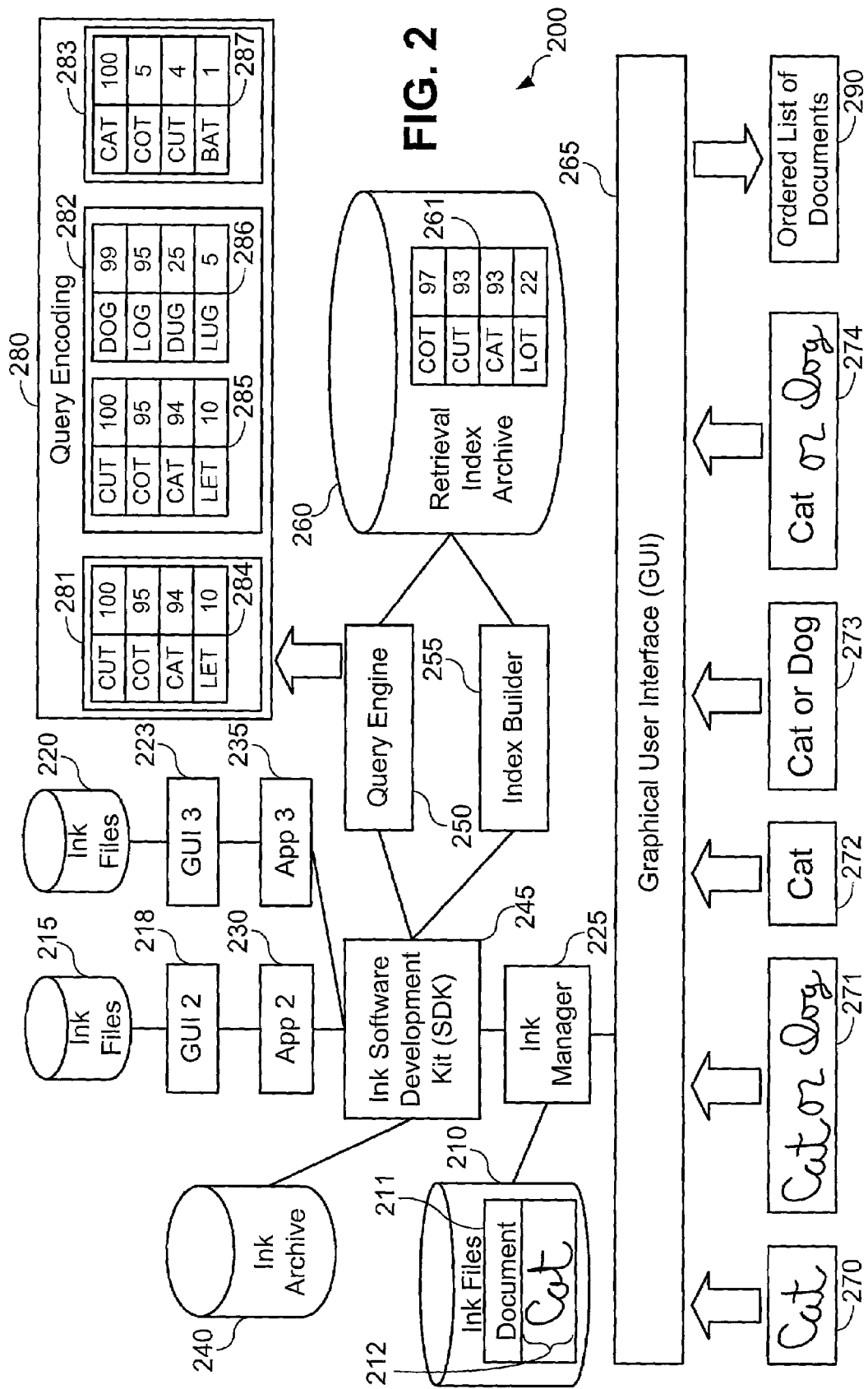
FIG. 2 is a block diagram of a system for retrieving handwritten documents in accordance with one embodiment of the present invention.

Method 100 begins in step 110 when a user enters a query. A query may be typewritten or handwritten or a combination. Exemplary queries are shown in FIG. 2, discussed below. Generally, a query will contain a number of words, some of which are query words while others are operators. For example, a query could be the typed expression "cat or dog." A more complex query could be the handwritten expression for "President (Johnson or Kennedy) but not Lincoln," where "President," "Johnson," "Kennedy," and "Lincoln" are search terms, while the parentheses, "or," and "but not" are operators. Queries are well known in the art of Information Retrieval (IR).

In step 120, the query is converted to one or more query stacks. A query stack is a recognition stack having a number of words and, for each word, a word score. Basically, a recognition stack represents the text words, which a handwriting recognition engine determines from an ink word, that are the most likely set of possible text words corresponding to the ink word. In general, a recognition stack contains all possible words known to a handwritten recognition system. In practice, the recognition stacks are subjected to a word score threshold or a rank threshold, which essentially truncates the recognition stacks.

In mathematical terms, a recognition stack is defined as follows. Let W be the set of all possible words and let I be a given handwritten occurrence of w∈W. A recognition stack associated with I is defined as the vector $\vec{S}(I)=(S_1(I), S_2(I), \ldots)$ where $S_i(I)$ is the word score of I given $w_i$, the i-th word of W, according to some machine recognition system. A recognition stack is essentially an N-best list, also called an "alternative word list," augmented by the word scores from some model. The recognition stack may be determined by a Hidden Markov Model (HMM) trained on an unconstrained, writer-independent data set to calculate $S_i(I)$ as a measure of the probability, assigned by the HMM, of I given $w_i$. In practice, $S_t(I)$ is subjected to a threshold to disregard low word scores. This results in recognition stacks that are smaller than what is possible.

In this disclosure, the term "query stack" will be used for a recognition stack determined from a query, and this query stack is an N-best list as described above. The term "document stack" will be used for a recognition stack determined from a document. Again, a document stack is an N-best list as described above. It should be noted that, in general, there will be multiple recognition stacks per query or per document.

Each word of a handwritten query is converted into a query stack (step 120). As used herein, the term "handwritten" and "ink" will be used interchangeably, and the term "handwritten" is used in its normal meaning, which is "written by hand." For one embodiment, each word of a text query is converted into a trivial query stack by giving a maximum word score to the query word and a minimum word score to all other stack entries. This assumes no error in entering a text query. In another embodiment, small word scores can be assigned to other entries in the query stack, which can take into account errors in entering text queries. The other entries in the query stack can be determined through edit distances or through other methods known to those skilled in the art.

Step 125 is an optional step. In step 125, the query is verified. Basically, the user is shown the query stacks that are generated and is asked if the stacks, or words in the stacks, are correct. Optionally, only the topmost word for each query stack is shown to the user. If the user indicates that the stack or the topmost word is incorrect, there are various steps that can be taken to correct the error. For instance, the user could be made to write the query or a portion of the query again. This is particularly useful if none of the words in a query stack is the correct word. The method, in these cases, reverts back to step 110. If the user indicates that another word (other than the topmost word) in a stack is the correct word, the stack can be rearranged by, for example, replacing the topmost word with the correct word. The topmost word will then be moved downward, as will the other words in the stack. The scores will remain in their positions, which means that the correct word now will be matched with the highest score.

The optional query verification step 125 allows the query to be verified before beginning a search. The ensures that the correct text query word is used for the search, yet also allows a query stack to be determined.

In step 130, a measure is determined between each query stack and each document stack. Each document stack is a recognition stack for a handwritten word in a handwritten document. Each handwritten document contains one or more handwritten words, and a handwriting recognition system will generally create a document stack for each of these words. Each query stack is then compared, through the use of a metric, to each document stack. This metric is referred to herein as a "measure." A measure is defined herein as any function that calculates to a value after a query stack is compared to a document stack. The measure essentially models the statistical patterns that appear in the recognition stacks, which includes both query and document stacks, to correct errors that occur in transcription. Put another way, the measure uses statistical patterns that frequently occur to correct transcription errors. In the context of IR, errors in transcription are corrected because the query should be expanded into a query stack that is similar to a document stack created from the same or similar ink. Thus, the measure gauges how similar query and document stacks are; the more similar these are, the more likely it is that they refer to the same ink word.

For example, assume that a person writes "cat" such that a recognition system always or nearly always creates the following recognition stack: (1) "cut" with a word score of 100; (2) "cot" with a word score of 95; (3) "cat" with a word score of 94; and (4) "lot" with a word score of 10. Assume that this recognition stack is stored as a document stack for a particular document. If this person writes a query of "cat," the measure for the query stack and the document stack will have a particular value that indicates the two stacks are very similar. This is true even though both recognition stacks are incorrect transcriptions of what the person actually wrote. Moreover, the person could enter a text query of "cat" and a measure determined between the query stack, which contains at least "cat" with a certain word score, and the document stack should also have an appropriate value indicating a relatively high similarity between the two stacks.

Therefore, even though the highest scoring word in the document stack of the handwritten word "cat" is incorrect, it is possible to return documents containing the document stack because of the use of the measure. The statistics of the recognition system will determine the stacks that are generated for handwritten words. If a person writes consistently, a recognition system should consistently determine document stacks for the person, even if the document stack contains errors. Therefore, the statistics of the recognition system can be used to correct errors in transcription.

There are a variety of measures that can be used. The following discussion outlines several different measures suitable for use with the current invention. Other measures may be used. When discussing these measures, a "traditional" text search is considered to be a system that selects the highest scoring alternative word as the most likely word. A traditional text search is a "text-to-text" search in that a text query (whether converted to text or entered as text) is compared with the most likely words of the document to determine matches between the query and words in the document.

The following discussion mainly refers to single-word queries. Multiple word queries using the measures disclosed herein are discussed after single-word queries are discussed. In the following discussion, step 140 will also be discussed. In step 140, the documents are scored, which allows the documents to be ranked. It should be noted that the techniques for scoring documents and the measures used for the same are merely exemplary. Those skilled in the art will realized that there are many suitable techniques.

One possible measure is a rank-based keyword measure. The traditional text search, also called a simple keyword score, can be enhanced by including words other than the highest scoring word from the recognition stack generated by a recognition model. In a rank-based keyword measure, multiple words from a recognition stack are selected and ranked. For instance, the top three words from the recognition stack could be selected and weighted by rank: 1.0 for the top word; 0.2 for the second word; and 0.04 for the third word. New word scores are determined by multiplying the old word score by the weight. An "expanded" document is essentially created, which has three weighted alternative text words for each handwritten word. The system then searches through this expanded document for a single search term that corresponds to one word of the query stack. Each word of the query stack is used as the single search term until each word of the query stack has been used to search through the document. Illustratively, the document score is the sum of the rank weights for each match, between a word in a query stack and a word in a document stack, in the expanded document. This document score will always be equal to or greater than the simple keyword document score. It should be noted that this is only one technique for creating a document score, and other techniques will be apparent to those skilled in the art.

Basically, this measure compares each word of a query stack or multiple query stacks to each word of a document stack. If a word in the query stack is contained in the document stack, the rank weight is added to a document score for the document.

This measure is very convenient and powerful, as it requires very little information from the recognition model. Only the first three candidates need be stored and indexed, and no word score information is needed. For instance, if a query stack contains the word "cat" and the document stack contains the word "cat" with a word score of 94, as the third highest scoring word, then 3.76 (or 94×0.04) would be added to the document score.

Another measure that may be used is a score-based keyword measure. In this measure, a threshold is used on the word score or rank. Each word is weighted proportionally to the word score assigned it by the recognition model, and optionally normalized so that the sum of the word scores for all the alternate words for one piece of ink sums to 1.0. The document score is the sum of the weights of all words that match each text query term. Stated differently, this measure basically compares each word of a query stack to each word of a document stack. If a word in the query stack is contained in the document stack, the corresponding proportionately weighted word score is added to a document score for the document.

Another suitable measure is the dot product measure. The dot product measure between a vector of the word scores for the query document stack, $\vec{q}$, and a vector of the word scores for the document stack, $\vec{d}$, is given by the following:

$$\cos(\vec{q}, \vec{d}) = \frac{\vec{q} \cdot \vec{d}}{\sqrt{(\vec{q} \cdot \vec{q})(\vec{d} \cdot \vec{d})}}$$

which is always between 0 and 1. Each element, $q_i$, of the vector $\vec{q}$ is equal to $S_i(I)$, as this term is previously defined. Similarly, each element, $d_i$, of the vector $\vec{d}$ is equal to $S_i(J)$. The dot product is then used to rank the database document stacks. The $\vec{q}$ and $\vec{d}$ may be pre-normalized to reduce computation.

In principle, all stacks would contain the same words. The word scores vary depending on the ink corresponding to each stack and the recognition engine parameters. In practice, the stack entries are subjected to a threshold, and the entries that are below the threshold are zeroed. This process reduces the size of the stacks from 30000 or more to approximately 16, or whatever is realized after the threshold is applied. But the dot product is taken as if the full 30000 dimensional vector were used. In other words, the system only multiplies scores in two stacks if they correspond to the same word. If either score for a word in both stacks is zero, the multiplication is skipped because it will have no effect on the end document score.

From the stack perspective, the dot product is the sum of the products of the optionally normalized scores of words that appear in both the query stack and a document stack. The score for a document is the sum of the dot products of all the stacks in the document with the stack for the query ink. The document score may be higher or lower than any of the keyword measure scores, but will only be zero when the keyword scores are zero.

Other measures, which may be used to enhance the previously discussed measures, are heuristic word score optimizations. The score based keyword measure and the stack dot product measure both involve word scores or weights that may not be optimal. It is possible to optimize these word scores by replacing them with simple functions of the original word scores. The simple functions are based on stack rank, where higher word scores have higher stack rank. It is beneficial to optimize the functions experimentally. When experimentally determining if a function improves document retrieval by a handwriting retrieval system, a precision-recall curve is often used. A short discussion of precision-recall curves will be given before proceeding with an explanation of heuristic word score optimization.

Precision and recall are defined as follows. Let q be a query, let d be a document and let D be the set of all documents in the document database. For each query q and each document d, a document relevance score is calculated. These document relevance scores are used to sort all of the documents. This sorted list of documents is referred to as the retrieval stack of q. Using a document score θ, retrieval stacks are truncated by pruning out all the documents whose document score is below θ. Let the truth set of q be the set of documents in D whose ground truth text contains the ground truth of q. Ground truth is defined as the words that a person really meant to write or type. For instance, if a person typed or wrote "cat" but meant to type or write "cot," then the ground truth is "cot" and not "cat."

Let η(q,D) be the number of documents from D which are in the truth set of query q. Let ηr(q,D) be the number of documents from D in the retrieval stack of q pruned using threshold θ. Let ηc(q,D,θ) be the number of documents from D in the retrieval stack of q pruned using threshold θ which are also in the truth set of q.

Using these definitions, recall and precision are defined as follows:

$$\text{Recall}(q, D, \theta) = \frac{\eta c(q, D, \theta)}{\eta(q, D, \theta)}, \text{ and}$$

$$\text{Precision}(q, D, \theta) = \frac{\eta c(q, D, \theta)}{\eta r(q, D, \theta)}.$$

Each point of a precision-recall curve may be computed by averaging the precision and recall at a given θ.

Returning to the discussion of heuristic word score optimization, in experiments, candidate functions are optimized using simple single word queries of words in a multi-writer database. The area enclosed by a precision-recall curve obtained by dot-product queries of the database can be used as the optimization criteria, which is a reasonable overall measure of retrieval performance. The beginning and end of the precision-recall curve are projected out to a fixed point, so that the endpoints do not have excessive influence on the enclosed area.

While there are other approaches that may prove useful when optimizing word scores, two approaches are disclosed herein. The first approach is a power function, wherein all word scores are raised to some power γ and then the resultant word scores are renormalized. Since the power γ is a single parameter, optimizing it is straightforward. The optimum power, determined experimentally, is quite high, at γ=7. After normalization, the score-based keyword measure or the dot product measure is used (step 130). Document scores are found as discussed above with reference to the score-based keyword measure or the dot product measure (step 140).

The second approach for optimization is performed by substituting the word score at each rank with a linear function of the word score, with a separate linear function for each rank. For this case, a Monte Carlo optimization of a few thousand trials was run, concentrating the variation in the parameters for the higher ranks. The sets of parameters that generated the best results are determined. These sets are then averaged and rounded off. The offsets beyond the first rank have been experimentally determined to be quite small, so they were all set to zero. The scale factors beyond the sixth rank were found to have little sensitivity, so these were set to 0.7, although other values may be used. The limited number of parameters, incomplete optimization, and rounding should have prevented any significant risk of over-training.

The word score functions used are then (step 130):

| Rank | New, Optimized Word Score |
|------|---------------------------|
| 1    | 200 + 3.1* raw word score |
| 2    | 1.3                       |
| 3    | 1* raw word score         |
| 4    | 1* raw word score         |
| 5    | 0.9* raw word score       |
| >5   | 0.7* raw word score       |

The new, optimized word scores are then renormalized. In experiments, the linear function results were slightly superior to the power curve results, as evidenced by precision-recall curves. After normalization, the score-based keyword measure or the dot product measure is used (step 130). Document scores are found as discussed above with reference to the score-based keyword measure or the dot product measure (step 140).

Another measure that can be used is the Okapi measure, which is discussed in more detail in Robertson et al., "Okapi at TREK-3," The Third Text Retrieval Conference (TREK) (1995), the disclosure of which is incorporated herein by reference. The Okapi measure may be determined (step 130) as follows:

$$O(q, d) = \sum_i \frac{f(i, d) f(i, q) idf(d, D)}{C_1 + C_2 L(d)/A + f(i, d)},$$

where the inverse document frequency, idf(d,D), is given by:

$$idf(d, D) = \log\left(\frac{N - n(d, D) + 0.5}{n(d, D) + 0.5}\right),$$

and where N is the number of documents in the database, D is the set of all document stacks, L(d) is the length of stack d (i.e., the number of word scores above a threshold), A is the average stack length, f(i,d) is the term frequency of the i-th word in D, which is defined as the normalized recognition word score of the i-th word times L(d), n(d, D) is the number of ink documents associates with D which have the same ground-truth text label as d, and $C_1$ and $C_2$ are tunable parameters. The parameters can be optimized or values that have been successfully used elsewhere may be used, since Okapi is known to be fairly robust to these parameters. In particular, the values $C_1$=0.5 and $C_2$=1.5 have been used with success, as described in Ponte et al., "A Language Model Approach to Information Retrieval," Proc. of the SIGIR, 275-281 (1998), and Turtle et al., "Efficient Probabilistic Inference for Text Retrieval," Proc. of the Recherche d'Information Assistee Par Ordinateur (RIAO) (1991), the disclosures of which are incorporated herein by reference. The score for a document (step 140) is the sum of the Okapi scores of all the stacks in the document with the stack for the query ink.

It should be noted that representative results for the Okapi and dot product measures are presented in Kwok et al., "Ink Retrieval from Handwritten Documents," Proc. of Intelligent Data Engineering and Automated Learning (IDEAL) (2000), the disclosure of which is incorporated herein by reference.

Another measure that can be used is a stack that uses n-grams for words in a query stack or words in a document stack or both. A stack that uses n-grams for words will be called an "n-gram stack" herein. An n-gram stack is a type of stack created when elements in the document stacks are not constrained to words in a vocabulary. Thus, the elements are not constrained to real words. A single character (e.g., "a") would be a unigram. Groups of letters (e.g., "ab") would be a bigram. An n-gram has n characters. Using n-gram stacks allows, as an example, the handwritten word "cat" to be transcribed to the text word "ceet." Comparisons can then be made between an n-gram query stack and an n-gram document stack. This measure can allow for proximate matches, such as a match between "cat" and "cap."

Generally, each unigram, bigram, trigram, and n-gram will have some score associated with it. These n-grams could then be used to determine ultimate scores for a query stack to document stack comparison and the document itself, through the methods previously described. For instance, a query stack word of "cat" and a document stack word of "cap" would not match as words, but would match for the bigram "cea" and the unigrams "c" and "a." The score for this particular match would likely be lower than an exact word match, perhaps by giving bigram matches less weight than a word match, but more weight than unigram matches. Each n-gram in a query stack can then be compared with each n-gram to determine a score for a particular query stack and document stack, and this score can be used to determine the document score.

Using n-grams in the context of ink-to-ink matching is described in El-Nasan et al., "Ink-Link," Proc. of the 15th Int'l Conf. on Pattern Recognition, vol. 2, 573-576 (September, 2000), which has been previously incorporated by reference. Similar techniques may be used here.

Another measure suitable for use with the present invention is an edit distance. An edit distance is a measure of "distance" between two words. It can be thought of as a measure of the similarity (or non-similarity) between two words. A simple measure of the edit distance is the number of characters that are different between two words. For example, the two words "cat" and "cot" differ in one character position, and the edit distance would therefore be one. Using this definition, a measure of edit difference could be determined through the following formula: (worst case edit distance−edit distance)/worst case edit distance. In the latter example, this is (3−1)/3, or ⅔. Thus, as edit distance increases, the edit distance measure decreases.

Those skilled in the art will realize that edit distances may be more complex than that just described. For example, an edit distance between words "tame" and "lame" may be less than one, because it is likely that a writer simply did not cross the "t" in the word. Note that the edit distance measure in this case increases from that calculated in the example of the last paragraph. As another example, an edit distance between the words "man" and "can" may be larger than one, because it is unlikely that the characters "m" and "c" would be written in a confusingly similar manner.

The previous discussion concerned single-word queries. For multiword queries, the score for a document is determined by multiplying the single term scores for the document. Other methods of word merging will be apparent to those skilled in the art. In order to prevent documents from dropping out if a single query word is missing, it is beneficial to offset word scores by 0.01 or some other small, non-zero quantity. While this introduces a very large penalty for zero scores, the document would still stay in the result list.

In step 150, certain documents will be selected for review. Each document has been given a score in step 140. These documents can be ordered as per their document scores, and these document scores determine relevance of the documents. This set of retrieval documents can be subjected to a threshold so that only the most relevant documents are displayed, such that all documents above a threshold will be returned. For instance, there could be no documents that contain the search terms in the query. In this case, no documents are selected if the threshold is appropriately large. In another embodiment, all documents are still selected for review, even though none contains all of the search terms in the query. This can occur if the threshold is small or zero. In step 160, the selected documents are displayed.

Thus, method 100 describes techniques for allowing typewritten and handwritten queries to be compared with document stacks, and for scoring documents based on this comparison. It should be noted that, in step 130, recognition stacks may be created from text documents that are not derived from ink documents. This allows ink-to-text matching, for instance, or even text-to-text matching. For example, document stacks may be determined from text in a document, and some additional words (other than the already existing text words) can be chosen for the document stacks. Each word can be given small word scores. If a query stack is determined from an ink word, the query stack can be used as described previously to rank documents. This is particularly useful in cases where the text document may contain some errors. For example, if the document has been converted to text through Optical Character Recognition (OCR) technology, there will likely be errors in the text. When creating a stack from a word, it would be relatively simple to determine a group of words that are similar in spelling to this word. Each word in the group can be assigned a score. Spell checkers in software already use such scoring techniques. Additionally, a search could be broadened by adding synonyms to the document stack. In this manner, ink-to-text or even text-to-text searching can yield more relevant results.

A system that implements method 100 may be relatively simple. In general, all that is needed is an ink index, an ink recognition engine, an implementation of method 100, and a user interface. Therefore, the present invention can be implemented through one program and some storage space for the ink index. Most ink retrieval systems are more complex, however, and the present invention will be discussed below in terms of a relatively complex ink retrieval system.

Referring now to FIG. 2, a block diagram is shown of a system 200 for retrieving handwritten documents in accordance with one embodiment of the present invention. It should be noted that FIG. 2 is merely exemplary; there are many different ways to configure and create a retrieval system. System 200 comprises ink file repositories 210, 215, and 220, applications 225, 230, and 235, ink archive 240, ink Software Development Kit (SDK) 245, query engine 250, index builder 255, retrieval index archive 260, and Graphical User Interfaces (GUIs) 265, 218, and 223. The ink files repository 210 comprises a document 211 that comprises a handwritten word 212 of the typewritten word "cat." Retrieval index archive 160 comprises a document stack 261. FIG. 2 also shows query encoding 280, queries 270, 271, 272, 273, and 274, and ordered list of documents 290. Query encoding 280 comprises encoded queries 281, 282, and 283, each of which comprises query stacks 284, 285 and 286, and 287, respectively.

FIG. 2 is best explained through an example. A user will query a set of ink documents for one or more search terms. After the query, the user expects to receive a list of documents that match the query or are considered relevant to the query or both. This is shown in FIG. 2, where a user enters in one of the queries 270 through 274 and receives an ordered list of documents 290 corresponding to the entered query. Ordered list of documents 290 contains a retrieval list of documents, which are usually ordered in terms of relevance. The retrieval list may be subjected to a threshold. The user can then select one of the documents (not shown) and view this document.

With the present invention, a user can create queries that are handwritten, typewritten, or a combination of the two: Query 270 is a single-word, handwritten query; query 271 is a multiword, handwritten query; query 272 is a single-word, typewritten query; query 273 is a multiword, typewritten query; and query 274 is a multiword query where part is typewritten ("Cat") and part is handwritten ("or dog"). These queries are entered through GUI 265.

The GUIs 265, 218, 223 allow a user to interact with the inner workings of system 200. Each GUI 265, 218, and 223 interacts with its application (ink manager 225, application 230 and application 235, respectively) to call elements of ink SDK 245 to process a query. In this example, GUI 265 will be discussed in more detail, and GUIs 218 and 223 can be considered equivalent to GUI 265. GUI 265 will interact with ink manager 225 to retrieve the document list 290. Ink SDK 245, in this exemplary embodiment, acts as a repository of all program code that works with ink. For instance, SDK 245 contains program code to render ink, move ink, copy ink, and recognize ink. The SDK 245 could be the Oik SDK from International Business Machines (IBM), Incorporated, of Armonk, N.Y. As previously discussed, the SDK 245 is simply one way to design an ink recognition and retrieval system. The present invention generally resides in the ink SDK 245, the query engine 250, and the index builder 255, although other configurations are possible. The ink SDK 245 contains functions that other programs can use.

For example, the ink manager 225 communicates with the ink SDK 245, directing the ink SDK 245 to index the ink document 211 and its single handwritten word 212. It should be noted that ink documents generally will be converted to many document stacks. System 200 is merely an example used to illustrate embodiments of the invention. The ink SDK 245 directs the index manager 255 to convert the ink document 211 to a document stack (in this example) and to index the document stack with appropriate reference to ink document 212 in ink files 210. In system 200, each application 225, 230, and 235 keeps its own ink files 210, 215, and 220, respectively, and the retrieval index archive 260 contains the document stacks and links to the appropriate ink in an ink document and to the appropriate ink document in ink files 210, 215, or 220. In this example, the index builder creates document stack 261 from word 212, and it indexes document stack 261 in retrieval index archive 260. The index manager is discussed in more detail below in reference to FIG. 3. Applications 230 and 240 may likewise direct ink SDK 245 to index their ink documents stored in ink files 215 and 220, respectively.

The ink archive 240 is not necessary but is used in some applications. The ink archive 240 is a repository of all the ink ever entered into the system 200. The ink SDK 245 allows applications 225, 230, and 235 to have access to the ink archive 240.

When a user writes a query, the GUI 265 creates a "query event" (not shown but discussed below in reference to FIG. 4) from the query and directs ink SDK 245 to return a list of documents, if any, meeting this query. The ink SDK 245 uses the query engine 250 to query the retrieval index archive 260 and to determine an appropriate list of documents 290 (see FIG. 2) that are relevant to the query. The query engine 250 is described below in greater detail in reference to FIG. 4.

The query engine 250 creates an encoded query for each query. Each encoded query contains a number of query stacks. In the example of FIG. 1, encoded query 281 corresponds to query 270, which comprises query stack 284; encoded query 282 corresponds to query 271, which comprises query stacks 285 and 286; and encoded query 283 corresponds to query 272, which comprises query stack 287. The query engine compares these query stacks with document stacks in retrieval index archive 260, through measures for stacks and scoring of documents as discussed above.

In this example, the handwritten, single-word query 270 is converted to the query stack 284. The query engine will compare, by using measures discussed above, query stack 284 with document stack 261 to determine a score of document 211, which ultimately will determine if document 211 is displayed and in what order it is displayed. Because the query stack 284 and the document stack 261 are similar, measures between the stacks will reflect this similarity. Thus, document 211 is likely to be considered highly relevant and should score high in the list of documents 290.

The handwritten, multiword query 271 is converted to the encoded query 282 by converting the handwritten "cat" to query stack 285 and the handwritten "dog" to query stack 286. Query stack 285 is similar to document stack 261, and will therefore likely produce measures that indicate this similarity. Query stack 296 is not similar to document stack 261, which means that measures for these two stacks will indicate this dissimilarity. Even though query stack 286 is not similar to document stack 261, because the query 271 uses the operator "or," document 211 will likely be assigned a high document score in the list of documents 290 because query stack 285 is similar to document stack 261.

Typewritten query 272 in this example is converted to query stack 283. Because this query is typewritten, it can be assumed that no errors in writing the query occur. In this situation, query stack 283 would contain the word "cat" with a very high word score and have all other entries zeroed. However, in FIG. 2, the system 200 attempts to determine what other possible words the user might have meant, and it assigns minor word scores for these words. Query 273 is typewritten and the "dog" portion may be treated similarly, either assigning no word score to each entry other than "dog" in a query stack or assigning minor word scores for probable words similar to "dog."

Query 274 has both a typewritten portion (i.e., "cat") and a handwritten portion (i.e., "or dog"). This is useful, for instance, if the user has saved the typewritten query "cat" and wishes to further restrict the query by adding the handwritten words "or dog." An encoded query for query 274 would contain query stacks 287 and 286.

It should be noted that FIG. 2 assumes that only the top four highest ranks will be part of a stack. This assumption is used solely so that the stacks fit neatly onto FIG. 2; stacks of much larger dimensions may be used. It should also be noted that the system 200 of FIG. 2 may be used in ink-to-text or text-to-text searches. In this embodiment, an ink query (or text query) is converted to one or more query stacks, and text words in the document 211 are changed to document stacks where the words are given the highest scores and additional words are assigned to each stack. The additional words may be similar in spelling or meaning, and will be given some nominal scores. This allows an ink-to-text or text-to-text search to be broadened to include words that would not normally be included.

Thus, FIG. 2 illustrates a system 200 that allows typewritten and handwritten document queries when system 200 searches and retrieves handwritten documents in response to the queries.

Turning now to FIG. 3, a block diagram of an index builder 255 is shown in accordance with one embodiment of the present invention. Index builder 255 comprises the ink SDK 245, a number of ink engines 310, 320, and 330, an index compiler 340, and index manager 350, and a number of retrieval index archives 260, 370, and 380. The index builder 255 indexes ink (i.e., handwritten documents or words) when new ink comes into the GUI 265, shown in FIG. 2.

An ink event 390 comes through the GUI 265 (not shown) and is routed to an ink engine 310 through 330, which creates an ink encoding 395. The ink event 390 is a representation of ink that comes from an ink entry device. For instance, there are ink entry devices where a pen is used that has a radio transmitter. Whenever the tip is pressed down, the pen transmits. A pad, onto which the pen is pressed, has an array of receivers and triangulates the location of the tip of the pen. The device records in "connect the dots" fashion: it knows the locations of the pen and time at each location and connects the locations to create a stroke. Thus, the ink event 390 comprises some mathematical description of handwriting.

The index compiler 340 communicates with the index manager 350. The index manager 350 is not required, but it controls which index is being built. In this example, there are a multiplicity of retrieval index archives 260, 370 and 380, and the index manager controls which index is built or modified. The index compiler 340 is a device that puts the ink encoding into a retrieval index archive, such as retrieval index archive 260.

The ink engine 310, 320 or 330 is a statistical model of the connection between what is written and what is implied. The ink engine 310, 320, or 330 essentially changes the ink event 390 to the bits and bytes of the ink encoding 395. The end result of the ink engine 310, 320 or 330 is a recognition stack, and ink encoding 395 will contain one or more such stacks.

Referring now to FIG. 4, this figure shows a block diagram of a query engine 250 in accordance with one embodiment of the present invention. The query engine 250 comprises the ink SDK 245, a query processor 410, a query engine 420, an index manager 350, a scribble attribute index 480, retrieval index archives 260, 370 and 380, a query encoder 430, a query expander 440, and ink engines 310, 320, and 330.

A query event 460 is routed to query processor 410. Query event 460 has a query, like queries 271 through 274 of FIG. 2. The query event 460 also contains context, which could be time (i.e., "find documents for Saturday") or documents (i.e., "find documents that are on a particular drive") or person (i.e., "find documents created by Bob"). The query processor 410 does all the bookkeeping and controls the query engine 250. The query part of the query event 460 gets passed to the query encoder 430 as query encoding 470. The query encoder 430 calls one of the ink engines 310 through 330 and receives one or more query stacks based on the query. The query expander 440 adds similar terms. For instance, a query might include the word "cat" and the query expander 440 could expand this to find "lion" and "feline." These expanded terms become part of the query stack for "cat." The user is usually given some control over the query expander 440 so that the query expanded 440 can be turned off or on.

The query encoding 470 is returned to query processor 410, only now it includes the query stacks and, if configured for this, expansion of terms. The query engine 420 processes Boolean operators, like "and," "or," or "but," and other operators, such as parentheses. The query encoding 470 is passed to the query engine 420 with a context. The query engine 420 determines which documents match the query as per the measures previously discussed, and query engine 420 can also score documents. The index manager 350 retrieves the documents that match. The scribble attribute index 480 "highlights" the matching terms found in the document, which makes it easier for a GUI to show the matching terms. The document list 450 is returned, and it includes ink mapping so that the ink documents may be retrieved.

The previous figures dealt mainly with techniques for creating query stacks and using those stacks to determine matches for queries. FIGS. 5 and 6 below outline techniques for further improving retrieval by providing multiple recognitions of handwritten documents.

Referring now to FIG. 5, a method 500 is shown for performing and using multiple recognitions of handwritten documents. Method 500 is used to determine a number of document stacks for a handwritten document by performing multiple recognitions with multiple handwriting recognizers. A handwriting recognizer is configured in multiple different configurations when performing method 500. Additionally, different handwriting recognizers may be used during method 500, if, for example, the handwriting recognizers cannot be reconfigured. In FIG. 5, it is assumed that there is one handwriting recognizer that can be configured in different ways, but one skilled in the art may easily modify method 500 to include multiple recognizers.

Method 500 can create an exhaustive, computer-searchable index into an electronic ink database and thereby enable quick searches for handwritten words or objects. The method has two basic stages. First, a database of handwritten documents is exhaustively indexed for all plausible interpretations or descriptors of ink in the handwritten documents, including alternate transcriptions and transcription and descriptor variants. Exhaustive indexing is done by using one or more recognizers. All descriptors (e.g., ASCII strings similar to or matching the handwritten ink) are usually cataloged into a readily searchable index database. The time-consuming process of generating the indices is generally performed at any time before a user requests a search. Secondly, the index database can then be quickly searched in various ways for the descriptor of any desired object to find all plausible occurrences in the ink database.

The method 500 has these principle advantages: (1) the method can be completely or largely automated, as desired; (2) the use of a plurality of recognition modes and (optionally) a plurality of recognizers to generate a plurality of descriptor indices for each ink object results in a higher likelihood of finding the desired object in the search phase; (3) the (largely automated) generation of an index database before the search application is launched results in quick, flexible and deep searches; and (4) the use of a plurality of search methods results in a higher likelihood of finding the desired object.

Method 500 begins in step 510 when ink is entered. The entered ink will generally be part of a handwritten document, and the ink can be stored by one or more computers, as shown in the previous figures.

In step 520, a configuration of a handwriting recognizer is selected from among several configurations. Each configuration will be optimal for a different recognition context in order to increase the likelihood that at least one of the transcriptions will generate a correct (or close) label of the ink object. As is known in the art, a handwriting recognizer can be configured to, for instance, preferentially recognize uppercase characters, lowercase characters, a mixture of uppercase and lowercase characters, or digits. Additionally, a handwriting recognizer can be configured to recognize one of a plurality of languages. For example, a handwriting recognizer can be configured to recognize French, Chinese, English, German, Spanish, or Japanese words and characters. Moreover, most handwriting recognizers contain a vocabulary that contains all the words and characters the handwriting recognizer uses to transcribe a handwritten document. A handwriting recognizer can be configured to only recognize characters and words in this vocabulary. In another embodiment, a handwriting recognizer can hypothesize characters and words when the character or word is not in the vocabulary. Furthermore, a handwriting recognizer may be configured to recognize printed words better than cursive words, or vice versa. Generally, configurations are determined by placing "constraints" on the handwriting recognizer. Such constraints are well known to those skilled in the art.

Initially, in step 520, one configuration is selected. In step 530, the handwriting recognizer is executed and document stacks are determined for this configuration. In step 540, it is determined if another configuration exists that has not yet be used. If so (step 540=YES), the method 500 repeats steps 520, 530, and 540, until all configurations have been used (step 540). The result of steps 510 through 540 are a number of document stacks for each word or character in a handwritten document. These document stacks may be used to retrieve handwritten documents (step 55) through the methods and apparatus disclosed above. This is discussed in more detail in reference to FIG. 6.

In another embodiment, the document stacks for a single word may be merged into one stack (step 550). The merging process can take place through a variety of techniques. For example, merging can take place by, for words that are the same, adding the word scores for the words. For instance, if a word "cat" is in one document stack with a word score of 100 and in another document stack with a word score of 50, the merged word score will be 150. In another embodiment, the word scores for words may be averaged. In the latter example, the word score for the word "cat" would then be 75. Additionally, statistical measures, such as nonlinear combination, may be used to determine which document stack or which words of a document stack are the most likely. One reference that discusses these statistical measures and merging is Perrone, "Improving Regression Estimation: Averaging Methods for Variance Reduction with Extensions to General Convex Measure Optimization," Institute for Brain and Neural System, Department of Physics, Brown University (1993).

If the document stacks are merged in step 550, the resultant document stack is generally sorted in order of document scores. The resultant document stack is then used during searching (step 550) as previously described. In another embodiment, the most probable word is used as the transcription of the handwritten word, and only one word is retained for the handwritten document. A search (step 550) will then compare this one word with a search query.

It should be noted that method 500 may be used to convert a query into multiple query stacks that are subsequently used for document retrieval. The multiple query stacks can be merged in step 540 to create a single query stack, which is then used to query the indexes in step 550. Alternatively, each of the multiple query stacks can be used to query the indexes in step 550. This will create multiple results, which can be scored through known techniques, combined, or used separately.

Referring now to FIG. 6, a system 600 is shown for performing and using multiple recognitions of a handwritten document. System 600 is similar to system 200. Consequently, only differences between the two systems will mainly be discussed herein. System 600 comprises an ink file repository 210, an ink manager 225, ink archive 240, ink SDK 645, query engine 250, index builder 255, retrieval index archive 660, and GUI 265. The ink files repository 210 comprises a document 211 that comprises a handwritten word 212 of the typewritten word "cat." Retrieval index archive 160 comprises a document stack 661. FIG. 6 also shows document stacks 680, queries 270, 271, 272, 273, and 274, and an ordered list of documents 290. Document stacks 280 comprise document stacks 684 and 685. Ink SDK 645 comprises a handwritten recognizer 630 and configuration 660, which further comprises configurations 650 through 655. In the example of FIG. 6, only one handwriting recognizer is shown. Multiple handwriting recognizers may be used. A first word stack can be created from at least one word by using a first handwriting recognizor, and a second word stack can be created from at least one word by using a second handwriting recognizor. A determination of whether a document should be retrieved can then be made by comparing the first and second word stacks with a third word stack.

As previously described, handwriting recognizer 630 is placed into one configuration by using a configuration from configuration 660, such as configuration 650. Using this configuration, the handwriting recognizer 630 generates document stack 684. The handwriting recognizer 630 is then placed into a second configuration by using another configuration from configurations 660, such as configuration 655. Using this second configuration, the handwriting recognizer 630 generates document stack 685. These document stacks can be indexed into retrieval index archive 660. In another embodiment, as shown in FIG. 6, these may be merged into one document stack 661.

In the example of FIG. 6, document stack 661 is generated by adding the word scores of the words in document stacks 684 and 685, and then placing the words into a resultant document stack 661. As shown in FIG. 6, the words may be sorted by word scores. The queries 270 through 274 may then be compared with document stack 661 (or document stacks 684, 685), through the methods shown and discussed above.

System 600 may be modified to include multiple handwriting recognizers, with multiple configurations for each. The document stacks 680 created can be exhaustive, to include many document stacks from the handwriting recognizers and their configurations. Optionally, some measure of "goodness" may be used to determine which document stacks or which words in the document stacks are the most likely word candidates. These most likely words may be stored.

Thus, FIGS. 5 and 6 show a method and system that provides better retrieval results because multiple handwriting recognizers are used to determine multiple document stacks for words in handwritten documents. One handwriting recognizer may be able to transcribe a word better than another handwriting recognizer. For example, a handwriting recognizer can be configured to recognize printed words better than cursive words. This recognizer may recognize some words with more accuracy than would a handwriting recognizer that is configured for cursive handwriting.

Figure 7:
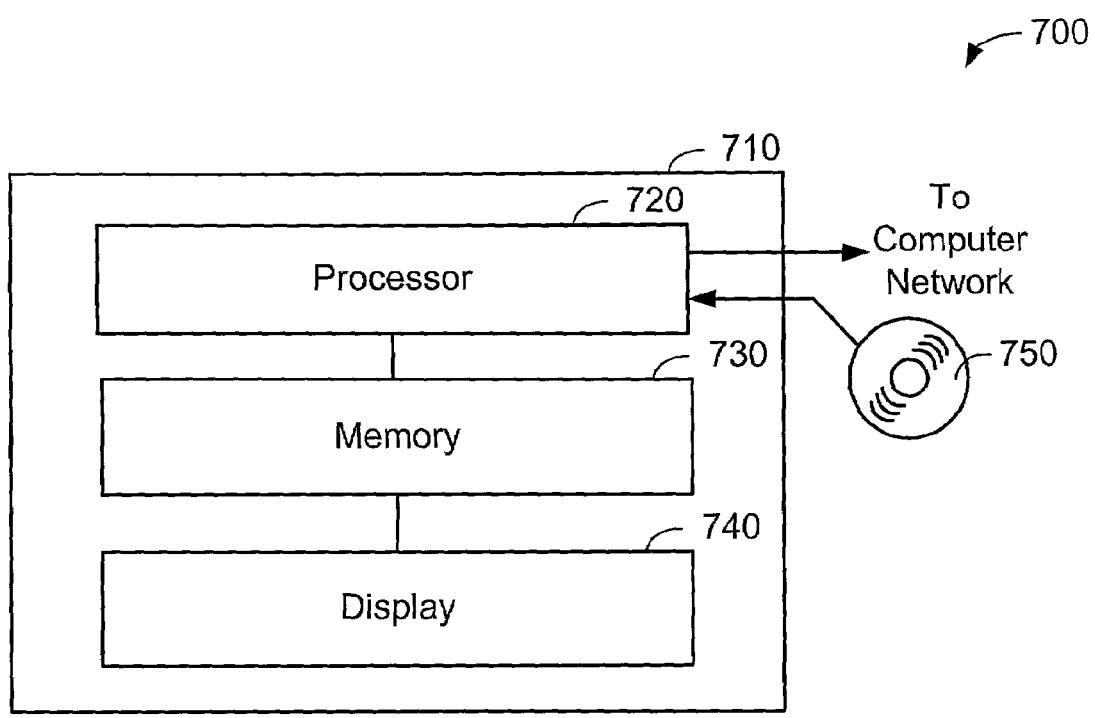
FIG. 7 is a block diagram of a system for retrieving handwritten documents in accordance with one embodiment of the present invention.

Turning now to FIG. 7, a block diagram is shown of a system 700 for retrieving handwritten documents in accordance with one embodiment of the present invention. System 700 comprises a computer system 710 and a Compact Disk (CD) 750. Computer system 710 comprises a processor 720, a memory 730 and a video display 740.

As is known in the art, the methods and apparatus discussed herein may be distributed as an article of manufacture that itself comprises a computer-readable medium having computer-readable code means embodied thereon. The computer-readable program code means is operable, in conjunction with a computer system such as computer system 710, to carry out all or some of the steps to perform the methods or create the apparatuses discussed herein. The computer-readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk, such as compact disk 750.

Memory 730 configures the processor 720 to implement the methods, steps, and functions disclosed herein. The memory 730 could be distributed or local and the processor 720 could be distributed or singular. The memory 730 could be implemented as an electrical, magnetic or optical memory, or any combination of these or other types of storage devices. Moreover, the term "memory" should be construed broadly enough to encompass any information able to be read from or written to an address in the addressable space accessed by processor 710. With this definition, information on a network is still within memory 730 because the processor 720 can retrieve the information from the network. It should be noted that each distributed processor that makes up processor 720 generally contains its own addressable memory space. It should also be noted that some or all of computer system 710 can be incorporated into an application-specific or general-use integrated circuit.

Video display 740 is any type of video display suitable for interacting with a human user of system 700. Generally, video display 740 is a computer monitor or other similar video display.

It is to be understood that the embodiments and variations shown and described herein are merely illustrative of the principles of this invention and that various modifications may be implemented by those skilled in the art without departing from the scope and spirit of the invention.

What is claimed is:

1. A computer-implemented method comprising the steps of:
creating a document stack from at least one word in a handwritten document;
creating a query stack from a query; and
determining a measure between the document stack and the query stack, where each query stack and document stack comprises a plurality of scores, wherein the measure is a dot product measure defined as follows $$\cos(\vec{q}, \vec{d}) = \frac{\vec{q} \cdot \vec{d}}{\sqrt{(\vec{q} \cdot \vec{q})(\vec{d} \cdot \vec{d})}},$$

where $\vec{q}$ is a vector comprising scores from the query stack, and wherein $\vec{d}$ is a vector comprising scores from the document stack.

2. A computer-implemented method comprising the steps of:
creating a document stack from at least one word in a handwritten document;
creating a query stack from a query; and
determining a measure between the document stack and the query stack, wherein each stack is not constrained to words in a vocabulary, wherein each of the words in a query stack or document stack are comprised of a number of n-grams, wherein probabilities are determined for each n-ram of the query stack and document stack, and wherein the probabilities of the n-grams are used in the measure.

3. A computer-implemented method for retrieving a subset of handwritten documents from a set of handwritten documents, each of the handwritten documents having a plurality of document stacks associated therewith, the method comprising the steps of:
a) creating at least one query stack from a query comprising one or more words, wherein each word is handwritten or typed;
b) selecting a handwritten document from the set of handwritten documents;
c) selecting a document stack from the selected handwritten document;
d) determining a measure between the at least one query stack and the selected document stack;
e) performing steps (c) and (d) for at least one document stack associated with the selected handwritten document;
f) performing steps (b), (c), and (d) for each handwritten document of the set of handwritten documents;
g) scoring each of the handwritten documents in the set of handwritten documents by using the query and the measures, thereby creating a number of document scores; and
h) selecting the subset of handwritten documents for display by using the document scores, wherein each stack is not constrained to words in a vocabulary, wherein each of the words in a query stack or document stack are comprised of a number of n-grams, wherein probabilities are determined for each n-gram of the query stack and document stack, and wherein the probabilities of the n-grams are used in the measure.

4. A computer-implemented method comprising the steps of:
creating a first word recognition stack, by using a first handwriting recognizer, from at least one word;
creating a second word recognition stack, by using a second handwriting recognizer, from the at least one word;
comparing the first and second lord recognition stacks with a third word recognition stack to determine whether a handwritten document should be retrieved;
configuring a handwriting recognizer into a first configuration to create the first handwriting recognizer; and
configuring the handwriting recognizer into a second configuration to create the second handwriting recognizer, wherein the first and second configuration are different, wherein the first configuration comprises a configuration caused by selecting a constraint from the group consisting essentially of an uppercase letter constraint, a lowercase letter constraint, a recognize digits constraint, a language constraint, a constraint wherein characters and words are recognized only if in a vocabulary, and a constraint wherein characters and words are hypothesized when not in a vocabulary, and wherein the second configuration comprises a configuration caused by selecting a S constraint from the group consisting essentially of an uppercase letter constraint, a lowercase letter constraint, a recognize digits constraint, a language constraint, a constraint wherein characters and words are recognized only if in a vocabulary, and a constraint wherein characters and words are hypothesized when not in a vocabulary.

5. A computer system comprising:
a memory that stores computer-readable code; and
a processor operatively coupled to the memory, the processor configured to implement the computer-readable code, the computer-readable code configured to:
create a document stack from at least one word in a handwritten document;
create a query stack from a query; and
determine a measure between the document stack and the query stack, where each query stack and document stack comprises a plurality of scores, wherein the measure is a dot product measure defined as follows $$\cos(\vec{q} \cdot \vec{d}) = \frac{\vec{q} \cdot \vec{d}}{\sqrt{(\vec{q} \cdot \vec{q})(\vec{d} \cdot \vec{d})}},$$

where $\vec{q}$ is a vector comprising scores from the query stack, and wherein $\vec{d}$ is a vector comprising scores from the document stack.

6. A computer system comprising:
a memory that stores computer-readable code; and
a processor operatively coupled to the memory, the processor configured to implement the computer-readable code, the computer-readable code configured to:
create a first word recognition stack, by using a first handwriting recognizer, from at least one word;
create a second word recognition stack, by using a second handwriting recognizer, from the at least one word;
compare the first and second word recognition stacks with a third word recognition stack to determine whether a handwritten document should be retrieved;
configure a handwriting recognizer into a first configuration to create the first handwriting recognizer; and
configure the handwriting recognizer into a second configuration to create the second handwriting recognizer, wherein the first and second configuration are different, wherein the first configuration comprises a configuration caused by selecting a constraint from the group consisting essentially of an uppercase letter constraint, a lowercase letter constraint, a recognize digits constraint, a language constraint, a constraint wherein characters and words are recognized only if in a vocabulary, and a constraint wherein characters and words are hypothesized when not in a vocabulary, and wherein the second configuration comprises a configuration caused by selecting a constraint from the group consisting essentially of an uppercase letter constraint, a lowercase letter constraint, a recognize digits constraint, a language constraint, a constraint wherein characters and words are recognized only if in a vocabulary, and a constraint wherein characters and words are hypothesized when not in a vocabulary.

7. An article of manufacture comprising:
a computer readable storage medium comprising one or more programs which when executed implement the steps of:
a step to create a document stack from at least one word in a handwritten document;
a step to create a query stack from a query; and
a step to determine a measure between the document stack and the query stack, where each query stack and document stack comprises a plurality of scores, wherein the measure is a dot product measure defined as follows $$\cos(\vec{q}\cdot\vec{d}) = \frac{\vec{q}\cdot\vec{d}}{\sqrt{(\vec{q}\cdot\vec{q})(\vec{d}\cdot\vec{d})}},$$

where $\vec{q}$ is a vector comprising scores from the query stack, and wherein $\vec{d}$ is a vector comprising scores from the document stack.

8. An article of manufacture comprising:
a computer readable storage medium comprising one or more programs which when executed implement the steps of:
a step to create a first word recognition stack, by using a first handwriting recognizer, from at least one word;
a step to create a second word recognition stack, by using a second handwriting recognizer, from the at least one word;
a step to compare the first and second word recognition stacks with a third word recognition stack to determine whether a handwritten document should be retrieved;
a step to configure a handwriting recognizer into a first configuration to create the first handwriting recognizer; and
a step to configure the handwriting recognizer into a second configuration to create the second handwriting recognizer, wherein the first and second configuration are different, wherein the first configuration comprises a configuration caused by selecting a constraint from the group consisting essentially of an uppercase letter constraint, a lowercase letter constraint, a recognize digits constraint, a language constraint, a constraint wherein characters and words are recognized only if in a vocabulary, and a constraint wherein characters and words are hypothesized when not in a vocabulary, and wherein the second configuration comprises a configuration caused by selecting a constraint from the group consisting essentially of an uppercase letter constraint, a lowercase letter constraint, a recognize digits constraint, a language constraint, a constraint wherein characters and words are recognized only if in a vocabulary, and a constraint wherein characters and words are hypothesized when not in a vocabulary.

* * * * *

UNITED STATES PATENT AND TRADEMARK OFFICE
CERTIFICATE OF CORRECTION

PATENT NO. : 7,627,596 B2 Page 1 of 1
APPLICATION NO. : 10/079741
DATED : December 1, 2009
INVENTOR(S) : Kwok et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1966 days.

Signed and Sealed this

Second Day of November, 2010

David J. Kappos
*Director of the United States Patent and Trademark Office*